March 10, 1959

R. A. GAISER 2,877,329

TRANSPARENT RESISTANCE HEATED PANEL
AND METHOD OF PRODUCING SAME

Filed May 25, 1950

Inventor
Romey A. Gaiser
Nobbe & Swope
Attorneys

United States Patent Office 2,877,329
Patented Mar. 10, 1959

2,877,329

TRANSPARENT RESISTANCE HEATED PANEL AND METHOD OF PRODUCING SAME

Romey A. Gaiser, Toledo, Ohio, assignor to Libbey-Owens-Ford Glass Company, Toledo, Ohio, a corporation of Ohio Application May 25, 1950, Serial No. 164,068

6 Claims. (Cl. 201—73)

The present invention relates broadly to electrically conducting films, and more particularly to films of this character in which the conductivity of the film is varied over its area to control the current distribution through the film.

Although the invention is in no way restricted to electrically conducting films of any particular type or composition, or to their use with any particular kind of base or supporting surface, it has to date proven most valuable in connection with transparent, electrically conducting films of tin oxide on glass sheets, and it will be specifically described in that connection here.

Glass sheets coated with transparent, electrically conducting films of tin oxide, that are applied by exposing the glass sheet while at a temperature approximating the softening point of the glass to the action of a tin compound in fluid form, have come to be quite widely used in de-icing windows or windshields in aircraft and other automotive vehicles.

In use, the electrically conducting film on the glass sheet is supplied with sufficient electrical energy, through suitable electrodes secured to the glass and in electrical contact with the film, to heat the glazing unit to a temperature at which ice or frost will be removed from, or its formation prevented on, the surface of the exposed face of the unit.

With de-icing glazing units of this character, electrodes are provided which extend along the length of the marginal portions that are adjacent two opposite edges of the filmed glass sheet, and with uniformly filmed glass sheets of rectangular shape this arrangement gives a uniform temperature throughout the area of the film upon application of the required amount of electrical energy to the electrodes.

However, when uniformly filmed glass sheets that are not rectangular are supplied with electrical energy, through electrodes arranged in the same way on the sheets, objectionably non-uniform heating of the unit results.

To illustrate, trapezoidal shapes are frequently encountered in aircraft designs and, in those instances where two edges of the glass sheet are parallel and the other two edges are divergent for example, it is impossible to produce a uniform heating pattern when current is applied to the film. Thus, if the electrodes have been applied along the two divergent sides, the area of the uniformly filmed glass where the diverging sides are closer together will become much hotter than the area of the glass where the diverging sides are further apart, when current is applied.

On the other hand, if the electrodes have been placed along the two parallel sides of the irregular sheet, excessively hot and cold areas will develop along the two divergent sides of the glass upon application of current.

Such non-uniform heating and the presence of alternate hot and cold areas are extremely objectionable, particularly in aircraft glazings. First, because the application of a normal amount of current to the unit will not bring the cooler areas to a temperature at which they will melt ice. Then too, attempts to raise the temperature of the cooler area, in order to overcome this condition, may so far overheat the other areas as to cause failure due to thermal shock resulting from excessive temperature differentials between the cool and hot areas.

Moreover, when the filmed glass sheet is combined with another sheet of glass and an interlayer of non-brittle plastic to form a laminated unit, as is usually the case in aircraft glazing, the hot areas in the film may cause overheating or bubbling of the plastic interlayer and thus seriously interfere with the normal stability of the lamination and possibly destroy its protective characteristics.

It is therefore an important object of this invention to control the temperature throughout the area of an electrically conducting film by controlling the current flow in the film.

A more specific object is to compensate for temperature differentials due to shape in a film of this character by varying the current carrying properties of various parts of the film area.

Another object is to provide an electrically conducting film on a surface of generally trapezoidal shape, that will heat uniformly upon the application of current thereto, by varying the thickness of said film in proportion to the variation in the width of the surface between two diverging sides.

Another object is the provision of a filmed glazing unit of non-rectangular shape that will heat uniformly upon the application of electrical current to the film, which unit includes a sheet of glass of approximately trapezoidal shape having a pair of electrodes along the two opposite diverging margins and a transparent electrically conducting film on the same surface as the electrodes and of a graduated thickness which increases in proportion to the divergence of the electrodes.

Other objects and advantages of the invention will become more apparent during the course of the following description, when taken in connection with the accompanying drawings.

In the drawings, wherein like numerals are employed to designate like parts throughout the same:

Figure 1:
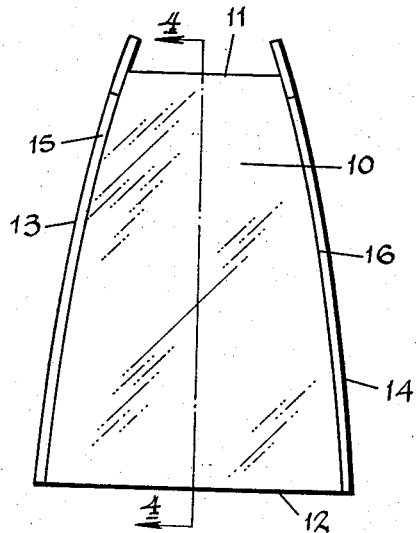
Fig. 1 is a face view of a finished non-rectangular light of glass that has been filmed according to the invention.

Referring now more particularly to the drawings, there is shown in Fig. 1 a sheet or plate of glass 10 of a trapezoidal shape quite commonly encountered in aircraft glazing. It will be noted that this particular sheet has two parallel sides 11 and 12 and two diverging sides 13 and 14. However, in many cases the corners of the sheet between adjacent sides may be rounded or curved, and the sides 11 and 12 may not be exactly parallel.

As indicated above, when such a glass sheet is filmed in the usual manner to produce an electrically conducting film of uniform thickness, it will be found upon the application of electrical current to the film through electrodes 15 and 16 positioned along the divergent margins of the sheets that the temperature of the filmed glass will be uniform throughout its area and, specifically, that it will be progressively hotter and hotter from the bottom edge 12, where the electrodes are farther apart to the top edge 11 where they are close together.

Or, in other words, the temperature of the filmed unit at any point from top to bottom will be found to be inversely proportional to its width.

According to the present invention however, I have discovered that surfaces having irregularly shaped areas can be heated uniformly with an electrically conducting film by compensating for the irregularity of the surface outline by variations in the thickness of the conducting film.

For example, in treating the glass plate 10 to produce a uniform temperature, resistance heated glazing unit, I locate electrodes 15 and 16 along the non-parallel margins as shown at Fig. 1 and then compensate for the non-parallel electrode placement by applying an electrically conducting film that is of uniform thickness in transverse section but that is of progressively decreasing thickness from the edge 12 to the edge 11.

The electrodes 15 and 16 may be of any one of a number of different materials, which can be applied in any convenient manner. For example, electrodes of sprayed copper, sprayed copper alloys, baked on gold, silver and platinum fluxes and combinations of these materials have all been used satisfactorily.

Similarly, as indicated above, the invention may be practiced in connection with various types of electrically conducting coatings, and various procedures can be followed to produce a film of proper gradations or variations in thickness. However, for the purpose of illustration, a preferred method of producing a transparent, electrically conducting film of tin oxide, of graduated thickness, on a trapezoidal shaped glass plate has been illustrated in the drawings.

Thus, as shown there, a glass sheet 17 to which electrodes 15 and 16 have been applied is first suspended, by means of tongs 18, from a carriage 19 running along a monorail 20. The carriage 19 is then moved along the monorail 20 to a position over a suitable tunnel type heating rail 20 to a position over a suitable tunnel type heating furnace 21 where the glass sheet 17 will be hung within the heating chamber 22 of the furnace through a slot 23 in the top wall thereof.

The furnace 21 may be heated in any suitable manner, such as by ribbon type resistance heating units 24 shut off from the heating chamber 22 by heat distributing and equalizing plates 25; and within the furnace the glass sheet is heated to substantially its point of softening.

Figure 2:
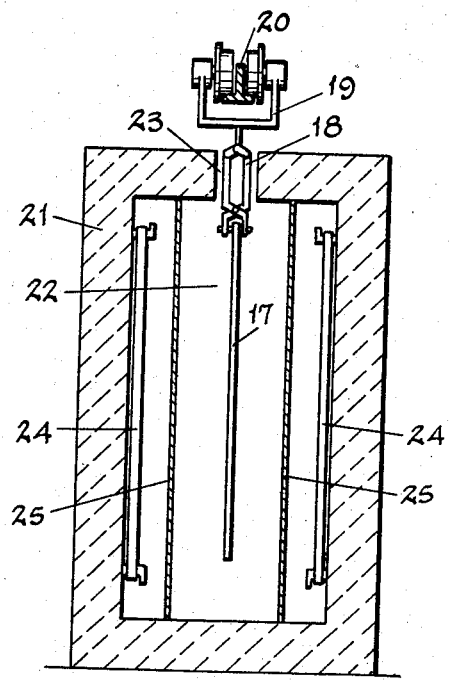
Fig. 2 is a vertical, sectional view through a heating furnace which may be used to heat the glass sheet prior to filming and/or to fire the electrodes onto the glass.
Figure 3:
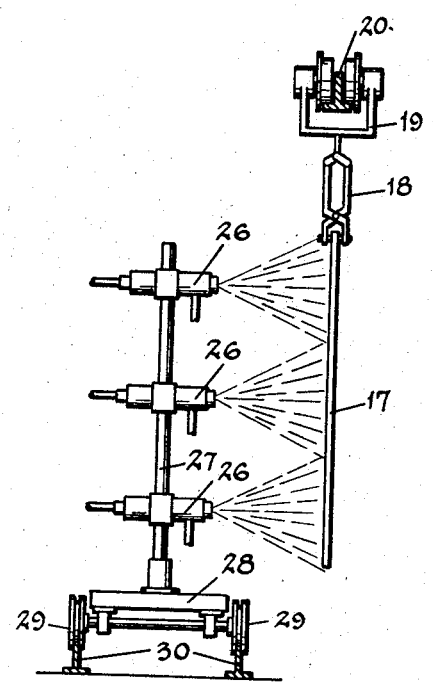
Fig. 3 is an end view of a spraying apparatus for applying the filming material to the heated glass.

At this temperature, the sheet is ready for the application of the conducting film and so the carriage 19 is moved further along the monorail 20 to bring the heated sheet 17 out of the furnace and into filming position as shown in Fig. 3.

An electrically conducting coating of tin oxide may be applied to a hot glass sheet in a number of different ways and by the chemical action of any one of a variety of different tin compounds. However, in actual commercial production, I prefer to apply it by spraying the heated glass with an alcohol solution of a tin halide, and specifically a 10% solution of stannic tetrachloride in isopropyl alcohol. This may be done by the use of suitable spray guns 26, adjustably mounted on a post 27 that is supported from a carriage 28 mounted on wheels 29 which run on tracks 30. The number of spray guns used will depend on the vertical dimension of the sheet 17 to be sprayed and on the area that can be covered by each gun, it being preferred that, with the guns arranged as shown and each emitting an equal volume of spray per minute, the sheet 17 will receive a substantially uniform coating of spray material from top to bottom.

In order to insure a uniform thickness of coating from side to side of the sheet, the carriage 28 is preferably reciprocated back and forth on the tracks 30 during the spraying cycle. However, as explained above, when a sheet of irregular shape such as the trapezoid 17 is provided with an electrically conducting film that is of uniform thickness from top to bottom of the sheet, and current is applied to the film through the electrodes 15 and 16, the temperature of the sheet will vary from the hottest area along the bottom side 12 to the coolest area along the top side 11.

Consequently, according to one phase of this invention, a uniform tempertaure is provided throughout the area of such a filmed surface upon the application of current, by graduating the thickness of the film from a relatively thick portion at the bottom edge 12 of the glass sheet to a thinner portion at the top edge 11. This procedure is effective for the purpose because heat is a function of $I^2R$ (current squared times resistance), so that an increase in the thickness of the film in the area of the glass where the distance between the electrodes is greatest will give a reduction in resistance in this area and a consequent increase in the current flow thereby increasing the heat. Conversely, thinning of the film in the area where the distance between the electrodes is least will result in increased resistance, less current flow, and consequently less heat.

In order to obtain absolutely equalized heating over the entire area of the glass it will be necessary that the film increase in thickness from the top edge 11 to the bottom edge 12 in direct proportion to the increase in distance between the electrodes 15 and 16 from the top to the bottom edge.

However, acceptable uniformity of heating over the entire surface for even such critical installations as aircraft glazing have been obtained by only approximating this condition.

To illustrate, satisfactory results in filming even severe non-rectangular shapes in a manner to provide suitably uniform heating of the filmed panel, have been obtained by varying the amount of spray solution delivered from a series of guns spaced to cover the area upon which the film of graduated thickness is to be deposited.

Thus, in practicing this phase of the invention with the spray guns 26 shown in Fig. 3 of the drawings, the upper gun which is adapted to coat the shortest distance between the electrodes 15 and 16, is adjusted to deliver less spray solution in a given interval than the bottom spray gun which traverses the area in which the electrodes are farthest apart, while the middle gun will be adjusted to deliver an amount of spray solution between that delivered by the top gun and that delivered by the bottom gun.

As a practical example, in spraying a sheet in the form of the trapezoid as shown in Fig. 1, and which is 23 23/32" tall, 9 13/16" across the top edge and 17½" across the bottom edge, commercially satisfactory heated glazing panels for aircraft were obtained by adjusting the three guns to deliver a quantity of spray solution as follows:

|  | Cc. per minute |
|---|---|
| Top gun | 200 |
| Middle gun | 300 |
| Bottom gun | 600 |

On a somewhat different shape, which was trapezoidal, except that it had rounded corners, and in which the glass sheet was 20 inches high, 18 inches across the top edge and 24 inches across the bottom edge, good results were had by adjusting the three guns to deliver as follows:

|  | Cc. per 20 seconds |
|---|---|
| Top gun | 26 |
| Middle gun | 36 |
| Bottom gun | 145 |

Figure 4:
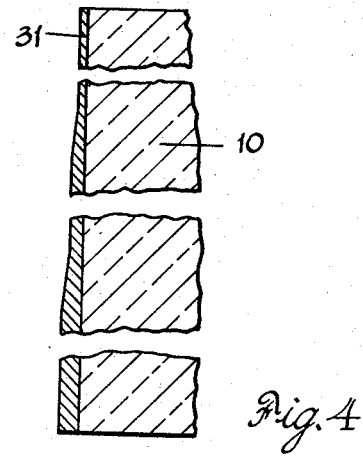
Fig. 4 is a sectional view taken substantially along the line 4—4 in Fig. 1.

The electrically conducting film 31 resulting from this type of spraying technique may exhibit a slightly stepped effect as shown in exaggerated form in Fig. 4. Nevertheless, it will provide a gradual decrease in thickness from the bottom edge 12 to the top edge 11, which decrease is generally proportional to the decrease in distance between the electrodes from the bottom edge to the top edge.

Different shapes and sizes of sheets will of course necessitate adjustments of these volumes, and may require additional spray guns to cover larger areas or give a more gradually changing thickness in the film.

It will also be apparent that a film of progressively increasing or decreasing thickness can be formed in other ways than by controlling the volume of spray solution delivered by the different guns. For example, similar results can be obtained by tilting the sheet to be sprayed so that one edge is closer to the spray guns than the other; or by delivering the same amount of spray solution from all guns and controlling the length of time that each gun operates.

The resistance of the electrically conducting film and consequently its conductivity, can also be altered in other ways than by changing the thickness of the film. For example, it can be done by supplying filming solutions of varying concentrations to the different guns, or by the addition of larger or smaller amounts of materials such as iron that will increase resistivity, or of materials such as antimony that will decrease it, to the solutions applied to the different guns.

Although the invention has been specifically described in connection with varying the resistivity of different areas of films of non-rectangular shape to produce a uniform heating in such films, it will be apparent that it can also be employed to provide controlled non-uniform heating of filmed surfaces that are of regular rectangular shape.

In fact, it is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

I claim:

1. A transparent resistance heated panel comprising a sheet of glass, a transparent electrically conducting film of varying thickness on a surface of said sheet, and a pair of elongated spaced electrodes in electrical contact with said film and each arranged at an angle to cross the area of different thickness in the film.

2. A transparent resistance heated panel comprising a sheet of glass, a pair of electrodes arranged in spaced diverging relation to one another on a surface of said sheet, and a transparent electrically conducting film between and in contact with said electrodes of a thickness that varies from one end to the other of said electrodes in approximate proportion to the distance between said electrodes.

3. A transparent resistance heated panel designed to produce substantially uniform heat throughout its area which comprises, a glass panel having a surface of generally trapezoidal shape, electrodes running along opposite diverging margins of said surface, and a transparent electrically conducting film between and in contact with said electrodes of a thickness which increases from the area of least distance between the electrodes to the area of greatest distance between the electrodes substantially in proportion to the increase in distance between the electrodes.

4. A resistance heated glazing unit comprising a sheet of glass in the shape of a trapezoid, electrodes along the opposite margins adjoining the non-parallel sides of said sheet, a transparent electrically conducting coating of tin oxide on a surface of said sheet between and in electrical contact with said electrodes that increases in thickness from one parallel side of said sheet to the other in approximately direct proportion to the increase in distance between the electrodes.

5. In a method of producing a resistance heated glazing panel designed to heat uniformly upon application of electrical current thereto, the steps of positioning a pair of elongated electrodes in converging relation to each other on a surface of said panel, applying a transparent electrically conducting film to the surface of said panel between said electrodes and in contact therewith, and graduating the thickness of said film from a maximum at the area of greatest distance between said electrodes to a minimum at the area of least distance therebetween.

6. In a method of producing a resistance heated glazing panel designed to heat substantially uniformly over its entire area upon the application of electrical current thereto, the steps of securing a pair of elongated electrodes in spaced converging relation to each other on a surface of a glass sheet, heating said sheet to substantially the softening point of the glass, spraying said heated sheet with a solution of a tin compound along a plurality of lines at right angles to and at spaced intervals along the bisector of the angle formed by said electrodes, and varying the amount of solution sprayed per minute along each of said lines from a maximum along the line nearest the edege of the glass where the electrodes are farthest apart to a minimum along the line nearest the edge of the glass where the electrodes are closest together.

References Cited in the file of this patent

UNITED STATES PATENTS

| | | |
|---|---|---|
| 1,881,444 | Flanzer | Oct. 11, 1932 |
| 2,021,661 | Kisfaludy | Nov. 19, 1935 |
| 2,061,106 | Schellenger | Nov. 17, 1936 |
| 2,429,420 | McMaster | Oct. 21, 1947 |
| 2,475,379 | Stong | July 5, 1949 |
| 2,557,983 | Linder | June 26, 1951 |

FOREIGN PATENTS

| | | |
|---|---|---|
| 145,637 | Austria | Dec. 15, 1935 |
| 101,011 | Australia | May 7, 1937 |

UNITED STATES PATENT OFFICE

CERTIFICATE OF CORRECTION

Patent No. 2,877,329                                          March 10, 1959

Romey A. Gaiser

It is hereby certified that error appears in the printed specification of the above numbered patent requiring correction and that the said Letters Patent should read as corrected below.

Column 2, line 69, for "uniform" read -- ununiform --.

Signed and sealed this 23rd day of June 1959.

(SEAL)
Attest:

KARL H. AXLINE                                         ROBERT C. WATSON

Attesting Officer                                    Commissioner of Patents